US008809441B2

(12) United States Patent
Sealey et al.

(10) Patent No.: US 8,809,441 B2
(45) Date of Patent: Aug. 19, 2014

(54) METHOD OF REINFORCING RUBBER AND RUBBER COMPOSITION

(75) Inventors: James H. Sealey, Golden, CO (US); Douglas R. Sedlacek, Centennial, CO (US)

(73) Assignee: The Gates Corporation, Denver, CO (US)

( * ) Notice: Subject to any disclaimer, the term of this patent is extended or adjusted under 35 U.S.C. 154(b) by 836 days.

(21) Appl. No.: 12/849,717

(22) Filed: Aug. 3, 2010

(65) Prior Publication Data

US 2011/0028257 A1 Feb. 3, 2011

Related U.S. Application Data

(60) Provisional application No. 61/230,807, filed on Aug. 3, 2009.

(51) Int. Cl.

| *C08K 3/04* | (2006.01) |
|---|---|
| *C08L 9/06* | (2006.01) |
| *C08L 21/00* | (2006.01) |
| *F16G 5/04* | (2006.01) |
| *F16G 5/06* | (2006.01) |
| *C08K 3/36* | (2006.01) |
| *C08L 7/00* | (2006.01) |

(52) U.S. Cl.
CPC ... *C08K 3/04* (2013.01); *C08K 3/36* (2013.01); *F16G 5/06* (2013.01); *C08L 9/06* (2013.01); *F16G 5/04* (2013.01); *C08L 7/00* (2013.01)
USPC ............ 524/496; 524/495; 523/218; 474/263

(58) Field of Classification Search
USPC .............. 524/59, 496, 495; 523/218; 474/263
See application file for complete search history.

(56) References Cited

U.S. PATENT DOCUMENTS

| 2,098,429 | A | 11/1937 | Morron |
|---|---|---|---|
| 3,420,913 | A | 1/1969 | Railsback |
| 3,823,223 | A | 7/1974 | Liska et al. |
| 4,244,234 | A | 1/1981 | Standley |
| 5,393,816 | A | 2/1995 | Kondo et al. |
| 5,853,849 | A | 12/1998 | Nishio et al. |
| 5,916,671 | A | 6/1999 | Dauber et al. |
| 6,268,421 | B1 | 7/2001 | Dittrich et al. |
| 6,306,953 | B1 | 10/2001 | Fortuyn et al. |
| 7,273,911 | B2 | 9/2007 | Fehn et al. |
| 7,531,596 | B2 | 5/2009 | Sandstrom |
| 2002/0183432 | A1 | 12/2002 | Wu et al. |
| 2008/0128065 | A1* | 6/2008 | Sandstrom .................... 152/510 |

FOREIGN PATENT DOCUMENTS

| GB | 1347069 | 2/1974 |
|---|---|---|
| JP | 10-231384 A | 2/1998 |
| JP | 11-269306 A | 5/1999 |

OTHER PUBLICATIONS

Malinova P; Nokolov R; Dishivski N; and Lakov L, "Modification Of Carbon-Containing Fillers For Elastomers," Kautschuk Gummi Kunststoffe, vol. 57, No. 9, pp. 443-445, (Sep. 2004).
Gajewski M; Jankowska H; Swiatkowski A; and Zietek S, "Compounds Of Sulphur With Carbon On The Surface Of Carbon Black And Activated Carbons. VI. Activated Carbon With Surface Modified By Sulphur Donors As A Filler For Elastomers," Polimery Tworzywa Wielkoczasteczkowe; vol. 26, No. 3, pp. 85-88, (Mar. 1981).
Gajewski M; Jankowska H; Swiatkowski A; and Zietek S, "Properties of Composites Containing Chemically Modified Carbon Fillers with the Aid Of Sulphur Donors," 27th International Symposium on Macromolecules, Strasbourg, vol. II, p. 1255-1259, (Jul. 1981).
Jain A; Rao TR; Sambi SS; and Grover PD, "Energy and Chemicals from Rice Husk," Biomass and Bioenergy, vol. 7, Nos. 1-6, pp. 285-289, (1995).
Gajewski M; Jankowska H; Zietek S, and Switkowski A; "The Effect of Carbon-Sulfur Compounds at Carbon Fillers Surface on the Properties of Rubber," International Rubber Conference, Kiev, paper A-36, (1978).
Gajewski M; Jankowska H, Swiatkowski A, and Zietek S; "Chemical Modification of the Surface of Carbon Black with the Aid of the Sulphurating Agents and its Influence on the Process of Reinforcing of the Amorphous Polyenes," Proceedings of the International Rubber Conference 1979, Venice, pp. 101-107, (Oct. 3-6, 1979).
Gajewski M; "Properties of Crosslinked Polyenes Containing Chemically Modified Carbon Black by Means of Sulfur Donors," Zesz. Nauk. Wyzszej Szk. Inz., Radom, Materialozn. Chem. Technol., Obuvia 12, 87-100 (1989).
Nowicki H, Nowicki G, and Sherman B, "GRPD to GAED Sorbent Test Method Name Change," Water Conditioning & Purification, (Feb. 2010).
Kinoshita K, "Carbon: Electrochemical and Physicochemical Properties," J Wiley & Sons, New York, (1988) p. 10.
Mantrell C, "Carbon and Graphite Handbook," Interscience Publishers, New York (1968) pp. 2-4.

* cited by examiner

*Primary Examiner* — James J Seidleck
*Assistant Examiner* — Deve E Valdez
(74) *Attorney, Agent, or Firm* — Paul N. Dunlap, Esq.; Jeffrey A. Thurnau, Esq.

(57) ABSTRACT

A rubber composition having a reinforcing filler of activated carbon having a pore volume of 0.15 cc/g or more, a weight average particle size of less than 140 microns, and a differential characteristic curve of pore volume versus adsorption potential by the GAED or equivalent method having a peak value at less than 5 cal/cc. The rubber composition may have activated carbon as the primary reinforcing filler at a loading of from 25 to 250 phr. Also described is a method including the steps of selecting a charcoal material, grinding the charcoal material, activating the charcoal material, and mixing the activated carbon into a rubber composition as the primary reinforcing filler.

22 Claims, 2 Drawing Sheets

METHOD OF REINFORCING RUBBER AND RUBBER COMPOSITION

BACKGROUND OF THE INVENTION

1. Field of the Invention

This invention relates generally to activated-carbon-reinforced rubber compositions and methods, more particularly to a rubber composition with activated carbon as the primary reinforcement.

2. Description of the Prior Art

It is well known that carbon black may be used as reinforcing filler for rubber. Carbon black may be defined as "virtually pure elemental carbon in the form of colloidal particles that are produced by incomplete combustion or thermal decomposition of gaseous or liquid hydrocarbons under controlled conditions." Conventional carbon black is exclusively a petroleum product. The key properties of carbon black are particle size (inversely correlating with surface area) and structure (shape effects in the particles that increase the effective surface area). Surface area may be measured by a number of methods including nitrogen adsorption ("$N_2SA$" or "$A_{BET}$"), iodine adsorption, and/or electron microscope. Carbon black surface areas tend to range between about 10 and 150 $m^2/g$. Carbon black particles tend to be agglomerates of primary colloidal particles, leading to a variety of structures. Average particle size of commercial grades of furnace blacks ranges from about 20 to about 100 nm, and a commercial thermal black (N990) has an average particle size of about 280 nm. The surface area of most carbon blacks is thus the external surface of the structured particles. A standard classification system for carbon blacks used in rubber products is described in ASTM D-1765.

Activated carbon ("AC") may be defined as "carbon material derived from charcoal that has been chemically or physically activated." AC may be prepared by heating charcoal in steam at 900° C. followed by exposure to air at 400° C. to produce surface oxides similar to that found in carbon black. Charcoal may be chemically activated by heating the raw material to 200-650° C. in the presence of a dehydrating agent such as $H_3PO_4$, $H_2SO_4$, or $ZnCl_2$. Charcoal may be defined as "carbon obtained by removing water and other volatile constituents from wood or other solid organic matter (e.g. bituminous coal, lignite, coconut shell, pulp-mill residue, etc.)." Activated carbon thus may be derived from renewable, non-petroleum based sources. Activated carbon may have extremely high surface area ranging from 450 $m^2/g$ to over 2000 $m^2/g$ due to a well-defined pore structure. Ash content can range up to about 60%, consisting mainly of silica and silicates of Al, Mg, Ca, and Fe. Activated carbon is typically used as an adsorbent to purify other substances. Adsorbent capability is determined by surface area, which is determined by size and distribution of pores, which is in turn determined by the carbonaceous starting material and the activation process. The surface area of AC is thus mostly internal to the pores. Adsorbent applications include decolorization, solvent recovery, air and water purification, deodorization, etc.

M. Gajewski, et al., "Properties of Composites Containing Chemically Modified Carbon Fillers with the Aid of Sulfur Donors," 27$^{th}$ *International Symposium On Macromolecules*, Strasbourg, July, Vol. II, pp. 1255-1258 (1981), discloses a study of carbon black N330 and activated charcoal CWZ-3, produced in Poland from broad-leaf wood, having mixed porous structure, 8% ash, 0.326 cc/g total pore volume, and 83 $m^2/g$ mesopore surface area. Comparisons with N330 carbon black (79 $m^2/g$ $N_2SA$) in an unspecified SBR formulation resulted in the unmodified activated carbon giving much lower modulus (M200 at 29.4 $N/m^2$ [sic] was <⅓ that of carbon black) and tensile strength (Tb=53.5 $N/m^2$ [sic] was less than ¼ that of carbon black). (It is believed the reported modulus and tensile strength may translate to 2.94 MPa (426 psi) and 5.35 MPa (776 psi), respectively, due to an omitted factor of $10^5$.)

A. Jain, et al., "Energy and Chemicals from Rice Husk," *Biomass and Bioenergy*, Vol. 7, Nos. 1-6, pp. 285-289 (1995), discloses that a silica-carbon mixture from conventional combustion and gasification of rice husk is suitable as a reinforcing filler for black rubber goods. Jain et al. also disclose a method of producing from rice husks a silica-rich, leached char comprising 39% fixed carbon which can be mixed with SBR rubber in various proportions to increase both the tensile strength and modulus of elasticity of the vulcanizates. The reinforcement is said to compare favorably with commercial metallic thermal carbon black (presumably something like N990, which is the least reinforcing of the common carbon blacks), the 40 phr compound exhibiting a Tb of 0.789 MPa (114 psi) and modulus of 2.4 MPa (349 psi), and the 100 phr compound exhibiting a Tb of 2.89 MPa (419 psi) and modulus of 14 MPa (2024 psi). Jain et al. also disclose a process for producing potassium silicate and activated carbon from the leached char. The activated carbon is said to be useful as activated carbon absorbent, for example, as a decolorizing agent or for absorbing organic solvents.

P. Malinova, et al., "Modification of Carbon-Containing Fillers for Elastomers," *Kautschuk Gummi Kunststoffe*, 57 Jahrgang, Nr. 9, pp. 443-445 (2004), discloses that activated carbon obtained by vapor gas activation of Chukurovo lignite coal with a relatively low ash content (11.5%) could be modified with ZnO to obtain a carbon filler with a favorable effect on SBR vulcanizates compared to the unmodified carbon filler. Also disclosed is a rubber composition with 50 phr unmodified activated carbon per 100 parts of SBR where the activated carbon exhibits 0.297 cc/g total pore volume, total pore surface area $A_{BET}$ of 257 $m^2/g$ and mesopore surface area $A_{MES}$ of 66 $m^2/g$, and the vulcanized composition exhibits M100 of 0.635 MPa (92 psi), M300 of 1.9 MPa (276 psi), Tb of 3.21 MPa (466 psi), and Eb of 517.5%.

U.S. Pat. No. 7,531,596 to Sandstrom discloses a rubber composition containing an antidegradant that produces MIBK as a byproduct and an MIBK-absorbing activated carbon of unspecified source comprised of a micro-crystalline, non-graphitic form of carbon having an average specific surface area determined by nitrogen adsorption of from about 500 to about 2000 $m^2/g$ and having at least 50 percent of the total pore volume made up of pores having a pore width of from about 1.8 to about 50 nm. In the only example, about 3 phr of activated carbon is used in a composition based on an IR/BR blend with 45 phr conventional N330 carbon black. U.S. Pat. Publ. No. 2008/0128065 A1 to Sandstrom discloses a rubber composition containing an oxygen-absorbing activated carbon of unspecified source, present at 5 phr in an IR compound with 50 phr conventional N330 carbon black.

U.S. Pat. No. 4,244,234 to Standley discloses an endless power transmission belt having reduced coefficient of friction sides, due to a friction-reducing layer comprising elastomer containing 2-20 phr activated carbon and at least one friction-reducing material. The composition also contains 20-50 phr conventional carbon black. The activated carbon is said to absorb ingredients of the belt body which would migrate to the belt surface and tend to increase the coefficient of friction.

Unexamined publications JP 10-231384 and JP 11-269306 disclose the use of activated carbon particles in diene rubber for improving tire frictional forces on ice or snow. These references teach blending 1-10 parts by weight activated carbon (preferably 1-5 or more preferably 1-3 phr) having 30-500 μm average particle diameter (e.g. coconut shell activated carbon obtained by carbonizing the husk of a palm nut, activating the carbonized husk, and powdering the activated husk and having 1,000-3,000 m$^2$/g inner specific surface area) with the usual carbon black and other ingredients. An example disclosed therein is an NR/BR blend with 55 phr of N220 carbon black incorporating 3 phr of a coconut shell activated charcoal of −325 mesh particles (50 micrometers of mean particle diameter) of particle size. More than 10 phr AC is advised against. A non-working example uses 20 phr of the AC with 55 phr of carbon black.

Thus, in the existing art, rubber compounds with AC as the primary or sole reinforcing filler fall far short in terms of physical properties compared to rubber compounds reinforced with conventional carbon blacks. Various chemical activation treatments, for example with zinc or sulfur compounds, have been reported to show some promising improvement in rubber reinforcement, but have not attained any commercial success in the rubber industry. Other prior uses of unmodified AC involve adding the AC to a rubber compound for its absorbent properties or frictional properties, but not for primary reinforcement.

SUMMARY

The present invention is directed to systems and methods which provide rubber reinforcement from renewable resources or coal in the form of activated carbon ("AC").

The invention is directed to rubber compositions having activated carbon as the primary or sole reinforcing filler. The activated carbon may be characterized by measuring the pore size or pore volume distribution by gravimetric adsorption methods, e.g., using tetrafluoroethane as an absorbent. According to the invention, the activated carbon has a differential pore volume curve versus adsorption potential that peaks at 5 cal/cc or less. Preferably the differential pore volume curve peaks at zero potential, or in other words, exhibits negative slope, i.e., a monotonic decrease in pore volume with increasing potential.

The activated carbon may be cellulose based including wood based or coconut based, or coal based. Primary reinforcing filler may be defined as filler present in an amount greater than any other reinforcing filler present in the composition. The composition may have 100 parts by weight of one or more elastomer and 25-250 parts ("phr") activated carbon. Other reinforcing filler may be present at less than 20 phr, or preferably substantially absent.

The activated carbon for the rubber composition may have a total pore volume of 0.15 cc/g or more, preferably 0.35 cc/g or more, and/or an average particle size of less than 140, less than 100, or less than 30 microns. The activated carbon may have an average specific surface area determined by nitrogen adsorption of about 250 m$^2$/g or greater. The activated carbon may have less than 50% ash content and/or greater than 50% carbon content.

According to an embodiment of the invention, the activated carbon for the rubber composition may be obtained by grinding particulate activated carbon (which may be spent material from an absorption process). The activated carbon for the rubber composition may be ground or milled to a predetermined particle size suitable for a desired application. The activated carbon may be reactivated by thermal and/or chemical treatment. Activated carbons which lack a favorable pore volume distribution may be treated with additional activation cycles to increase the proportion of large pores.

The invention is also directed to a method including the steps of: (a) selecting a charcoal material; (b) grinding the charcoal material or the activated charcoal; (c) activating the charcoal, for example chemically or by heat, steam or the like; (d) optionally removing activated carbon particles larger than about 45 microns or larger than 325 mesh screen; and (e) mixing the activated carbon into a rubber composition as the reinforcing filler or as the primary reinforcing filler. The charcoal material selected may be an activated carbon material. The mixing may include blending the activated carbon and a polymer before adding any curatives.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Preferred aspects of this invention will be described with reference to the accompanying drawings, in which like numerals designate like parts in the several figures, and wherein.

DETAILED DESCRIPTION

This invention relates to the use of activated carbon as a reinforcing filler in elastomers, rubber, and rubber products. In one embodiment, the AC is the primary reinforcing filler in the elastomer or rubber compound, completely replacing conventional carbon black. As the primary reinforcing filler in a rubber compound, the AC may be used at levels up to 250 parts by weight per hundred parts of elastomer ("phr"), preferably more than 20 phr, or preferably from about 25 up to about 150 phr. The term primary reinforcement, as used herein, means more loading by weight, volume, or other appropriate measure, than any other particulate reinforcing filler present in the compound. Particulate reinforcing fillers includes carbon blacks, silicas, treated clays, and the like. The rubber compounds may include other known compounding ingredients, including for example, antioxidants, antiozonants, and other antidegradants; process aids, oils, resins, internal and external lubricants; additional reinforcing fillers including silica, carbon black, short fibers, whiting, clay, etc.;

inert fillers and extenders; adhesion promoters, curatives and accelerators and vulcanization coagents; and the like. In other embodiments, a preferred AC is used as a reinforcing filler, optionally with other reinforcing fillers in any amount but preferably less than 20 phr or no other particulate reinforcing fillers. As a reinforcing filler, the useful loading of AC may be up to about 250 phr, depending on the elastomer and/or compound. The amount of AC in the rubber composition may be more than the total of all other reinforcing fillers present in the compound.

The AC may be based on carbon from coal, wood or other cellulosic plant matter, or the like. Useful coal sources include lignite, bituminous, and anthracite coals. Wood sources include old timber, hardwood, and softwood, which may be in the form of chips, saw dust, and the like. Other useful plant or vegetable matter includes stalks, husks, shells, and the like. Preferred AC includes AC based on coal, wood, and coconut shells or husks. A preferred AC may be wood-based.

The starting materials for AC may be pyrolyzed, carbonized or graphitized initially in a baking step, i.e., treatment at high temperatures (greater than about 600° C.) in reducing or inert atmospheres, for example in the presence of steam, resulting in a char or charcoal. Coal may not require a separate carbonization step. Carbonized materials may be activated by thermal or chemical treatment. Thermal treatment includes activation by heat (for example at temperatures of from 800° C. to 1000° C.) or by heat in the presence of steam, air, or carbon dioxide. Chemical treatment includes treatment with chemicals like phosphoric acid, sulfuric acid, zinc chloride, and the like. The AC can be washed or extracted to remove excess acid. It may be advantageous that the initial activation (and/or the additional activation or reactivation cycles discussed below) is not by means of acid. Acidic treatments and/or fillers can potentially interfere with common rubber cure systems. The process of making powdered AC generally includes a grinding step and particle size classification step, generally based on standard screen or sieve sizes. The grinding step may be carried out on the char or charcoal before the activation, or on the AC after the activation step, or in two or more steps both before and after activation. According to an embodiment of the invention, the AC particles should be very fine, preferably substantially 100% passing through a 325-mesh screen. The final AC particles may be agglomerated or pelletized for ease in handling, reduced dust, etc. Commercially available AC is designated powdered AC ("PAC") or granular or granulated AC ("GAC") depending on particle size, either of which may be ground to a useful particle size for the present invention. Powdered AC is preferred. Granular AC may only be used provided the granules are friable enough to permit dispersion of the ground particles in rubber in conventional rubber mixing equipment.

The AC has a fine pore structure, and the pores may be classified by size according to the International Union of Pure and Applied Chemistry as "micropores," "mesopores," and "macropores." Micropores are those having a pore width of less than 1.8 nm, mesopores have a pore width of from 1.8 to 50 nm, and macropores having a pore width of greater than 50 nm. It is the presence and pore size distribution of the micropores and mesopores which are considered to contribute to the adsorptive capacity of the activated carbon. For example, a relatively high pore volume percentage of mesopores (e.g. above 50 percent of the total pore volume) may be generally desirable for some adsorbent applications. It is believed, without intending to limit the scope of the invention, that reinforcement of rubber compositions may be advantageously enhanced by selecting AC with a high pore volume percentage of mesopores and/or macropores, because larger pores may provide easier access for the rubber macromolecules to bind to the AC surface, leading to lower void volume, more usable surface area, and ultimately better reinforcement. The carbon generally has a structural density of about 2-2.3 g/cc. However, due to the presence of pores, the bulk or apparent density may be much lower, for example from 0.2 to 0.6 g/cc. According to an embodiment of the invention, the total pore volume of the AC may be 0.15 cc/g or more, preferably 0.35 cc/g or more, or about 0.5 cc/g or more. The activated carbon may have an average specific surface area determined by nitrogen adsorption of about 200 $m^2$/g or greater, or of 300 or 500 $m^2$/g or more.

The AC may preferably be ground to a fine powder, and then optionally reactivated. The grinding may be carried out in any suitable milling equipment, for example, in a ball mill, hammer mill, jet mill, vibratory mill, or the like. The reactivation may be carried out by heat alone in the presence of an inert atmosphere at temperatures of from about 100° C. to 1000° C., or above about 400° C., or at about 750° C. It is believed that grinding exposes new surfaces which might benefit from reactivation and provide advantageous interactions with elastomer. Alternately, the charcoal may be ground and then activated by heat and/or a chemical process.

According to an embodiment of the invention, the AC particles must be very fine, preferably substantially 100% passing through a 325-mesh screen, or preferably substantially all passing through a 400-mesh screen. Alternately, the ground AC may have a particle size less than 45 microns. Alternately, the ground AC may have an average particle size less than about 30 microns, or less than 20 microns, or less than 10 microns, or less than about 1 micron. Commercially available AC is not this fine. Therefore, if commercially available AC is used, additional grinding and/or activation may be necessary as described herein. Preferably the charcoal is ground or pulverized to a suitably fine particle size range before activating so that additional grinding is not needed.

In one embodiment, the AC is based on wood charcoal that has been activated, then ground to a very fine powder, and optionally subject to additional activation or reactivation. The activation process may be carried out at a temperature in the range of from about 100° C. to about 1000° C. (about 200-1800° F.), in equipment such as a rotary kiln in the presence of a gas such as hydrogen, nitrogen, steam, carbon dioxide, or oxygen. Additional activation may be carried out by heat alone in the presence of an inert atmosphere such as argon at temperatures of about 750° C. The ground AC may be activated chemically, such as with phosphoric acid. Preferably the ground AC is reactivated by heat alone. In one example according to an embodiment of the invention, the activation or reactivation takes place within the ball mill jar used to grind the AC and at a temperature of about 870° C. (1600° F.) under an argon atmosphere. Reactivation can be carried out in separate heating equipment after grinding.

In a preferred embodiment, the AC is agglomerated or pelletized to reduce dust in storage and handling and air-born material losses during mixing. An agglomerated AC is advantageous so that manufacturing plants will not need to deal with fines during storage and handling. The hardness of the agglomerates should be selected so that they break up during rubber mixing operations. Any method of agglomerating or pelletizing carbon black may be utilized. By way of non-limiting example, one or more binders such as fatty acids, waxes, glycols, and the like may be applied for example in an aqueous medium that is later dried.

In another embodiment, the AC may be mixed with oil to prevent dust or dusting and improve handling. The amount of oil in the oil/AC mixture may advantageously be in the range of from 15% to 50% oil by weight, preferably from 20% to 35% be weight. Less than 15% oil will not suitably prevent dusting, while more than 50% oil will tend to make a tar-like material that is hard to handle.

According to embodiments of the invention, the activated carbon may have less than 50% ash content and/or greater than 50% carbon content. Preferably the activated carbon may have less than 20% ash content and/or greater than 80% carbon content, or may have 10% or less ash content and/or 90% or more carbon content.

Some definitions used herein follow. "Polymer" is defined as a substance consisting of molecules characterized by the repetition of one or more types of monomeric units. "Elastomer" is defined as rubber or a polymer which has properties similar to rubber. "Rubber" is a material capable of recovering from large deformations quickly and forcibly, and can be, or already is, modified to a state where it is essentially insoluble in boiling solvent. "Crosslinking," "vulcanization," and "curing" are terms used interchangeably herein to describe the irreversible process by which a rubber compound, through a change in chemical structure (for example crosslinking) becomes less plastic and more resistant to swelling by organic liquids while elastic properties are conferred, improved or extended over a larger temperature range. A "compound" is an intimate admixture of a polymer with all the materials necessary for the finished article. "Reinforcement" is the act of increasing the mechanical performance capability of rubber by the incorporation of materials which do not participate significantly in the vulcanization process. A "reinforcing agent" or "reinforcing filler" is a material used to reinforce a rubber. A "filler" is a solid compounding material usually in finely divided form, which may be added in relatively large proportions to a polymer for technical or economic reasons. An "inert filler" is a filler that has no reinforcing effect. Most all particulate fillers have some reinforcing effect, so it may be more appropriate to identify the nature of the reinforcement and the level, for example, highly reinforcing or low-reinforcement fillers. Tensile modulus or "modulus" is more precisely described as "tensile stress at a given elongation," and is indicated by the letter "M" followed by the given elongation in percent, e.g. M100, M200, or M300. "Elongation" is the extension of a uniform section of a specimen expressed as percent of the original length. Elongation at break is indicated by "Eb". Tensile strength, or tensile stress at break, is indicated by "Tb". Tensile testing may be carried out according to ASTM D-412, or equivalent. More definitions related to rubber and rubber compounds may be found in ASTM D-1566, the contents of which are hereby incorporated herein by reference. Abbreviations used for elastomers, such as SBR, IR, BR, EPDM, etc., are in accordance with the nomenclature of ASTM D-1418, the contents of which are hereby incorporated herein by reference. Thus, so-called "hard rubber," which is not capable of large deformations and comprises a high percentage of sulfur (e.g. ≥30% sulfur), is not considered within the scope of the invention.

A significant advantage of activated carbon over carbon black is that AC is a material that may be derived from almost any locally grown vegetable matter, i.e., renewable sources. It is also believed that suitable activated carbon for use in reinforcing rubber according to the invention may be produced economically.

In an embodiment of the invention, spent AC from water purification processes may be advantageously used as a reinforcement or a as a primary reinforcement for rubber compounds. The particular AC material is designed for water purification, which involves a process of adsorption of impurities from water until the carbon is "spent." The carbon is sometimes reactivated and used again. The cycle may continue until the granules or powders are too fine to handle in the reactivation process. At that point the spent AC may be utilized according to an embodiment of the present invention by optionally grinding the AC further, and then by reactivating the AC thermally or chemically in a predetermined atmosphere or in an inert atmosphere to increase the pore size to a suitable range. The AC may then be added to a rubber compound. Preferably the reactivation is by a steam process.

Representative of various commercially available activated carbons for various purposes are, for example, activated carbon and activated carbon families from the MeadWestvaco company such as, for example, those sold under the trademark NUCHAR® with designations such as WV, RGC, AquaGuard, SA, SN, HD, BX, and MWC; activated carbon from the Carbochem Company such as, for example those sold under the trademark CARBOCHEM® with designations such as GS-75, VP-30, PS-40, DC-50, DC-40, PC-900, LQ-830, LQ-1240, LQ900S, LQ-1240 and CA-50; activated carbon and activated carbon families from the Calgon Carbon Corporation as, for example those sold under the marks and designations Carbosorb™, TOG, TNS, DSR, CPG, OLC, GW, Filtrasorb™, Centaur™, MRX™, and WPX, WPH™, Sorbamine™, Vapor Pac™, Cal™, Cane Cal™, GRC, WPC, RB, RC, BL, C, PWA; activated carbon and activated carbon families from Norit Americas such as, for example those sold under the trademarks DARCO®, PETRODARCO®, NORIT®, GRO-SAFE®, and HYDRODARCO®; activated carbon and activated carbon families from Carbon Activated Corporation; etc.

In the following examples, inventive examples are identified by "Ex." and comparative examples by "Comp. Ex."

Table 1 shows two rubber compound compositions used in the examples. Compound B has some silica added, but is otherwise the same as compound A. These compounds were generally mixed in two stages in a BR Banbury internal mixer according to standard rubber mixing practice with reinforcing fillers in a first mixing stage and curatives added in a second stage. When comparative examples with carbon black were mixed, the carbon black was added in the first mixing stage. Sometimes the activated carbon was added on a two-roll mill to a premixed Banbury compound which already had curatives, as noted in the tables below. It is believed that a preferable mixing process is one that maximizes adsorption of polymer onto or into pores of AC, and minimizes adsorption of other ingredients, especially curatives. For example, mixing may include blending the activated carbon and polymer before adding any curatives, such as in a separate mixing stage.

Table 2 documents a number of activated carbon samples utilized in the examples that follow. The samples were generally received from commercial AC suppliers as indicated in the table. Additional processing was carried out in some cases before making the rubber compounds with thus modified samples. Two different grinding processes were used. AC samples B1, B2, C1, and C2 were ground in a vibratory mill with one-inch, ceramic, angle-cut cylinders as the grinding media. All other AC samples indicated as "ground" were ground using a rotating ball mill with steel ball bearings ranging in size from 5/16-inch down to 1/32-inch as the grinding media. Generally the grinding process lasted one or two hours. The acid reactivation process involved a room temperature treatment with 85% phosphoric acid, followed by filtration to recover the AC, and washing the filter cake with tap water. The heat reactivation process involved heating the AC in a steel vessel under argon atmosphere. The vessel was occasionally agitated to prevent agglomeration of the AC. The vessel temperature reached 1600° F., while off gases were typically observed to be in the range 1200-1400° F. The heat reactivation process generally lasted from one-half to one hour.

Mooney viscosity reported below was measured with a Mooney viscometer according to ASTM D-1646. The cure characteristics reported below were measured with a moving die rheometer ("MDR") according to ASTM D-5289. Tensile testing followed ASTM D-412. "C-Tear" was determined according to ASTM D-624 using die-C. "DeMattia" crack growth testing followed ASTM D-813 with grips approaching to 0.5 inch, samples pierced, and crack growth rate reported in units of inches per megacycle. "Pico" abrasion testing followed ASTM D-2228 using abrasion index for the results, according to which a higher number indicates better abrasion resistance. Rubber hardness or "durometer" testing followed ASTM D-2240.

AC sample A is an activated carbon derived from coconut shells, which has one of the highest surface areas that is readily available. Table 3 shows the results of compounding sample A into rubber compound A at two levels, 102 phr and 189 phr. The 102 phr level in Comp. Ex. 3 was chosen to give the same volume fraction loading as the 85 phr of N660 in Comp. Ex. 2, since the specific gravity of carbon black is 1.8, while that of AC is reported to be about 2.2. Table 3 shows that AC sample A increases the viscosity of the uncured rubber compound over that of the unreinforced control (Comp. Ex. 1) much more than does N660. However, the cure rate (tc90) is dramatically slower, and the tensile modulus of the cured rubber does not increase as much as with N660. Moreover, the tensile strength and breaking energy are significantly degraded over that of the unreinforced control. These mixed results are believed to indicate that commercial granular activated carbons (which are designed for adsorbent use) have granules too large to reinforce well in rubber and too hard to disperse in rubber, leading to poor ultimate properties (i.e., Tb, Eb, C-Tear, and breaking energy). Subsequent AC samples were therefore obtained in powdered form. As will be seen, smaller particle size results in better ultimate properties or high-strain reinforcement. Nevertheless, larger particle size may provide adequate low-strain reinforcement of the modulus for some uses even if ultimate properties are poor.

Table 4 shows that powdered AC samples from coal and coconut shells can have significant reinforcing effect when used as the primary reinforcing filler in a rubber compound. AC samples B and C were each compounded into rubber composition B at two levels chosen to be the same weight loading and the same volume loading as the N660 control Comp. Ex. 6. The reinforcing effects of samples B and C (as received) are significantly better than sample A, but not quite as good as N660. In particular, Table 4 indicates that the ultimate properties are significantly improved over the unreinforced Comp. Ex. 5. Improved ultimate properties include C-Tear, Tb, and breaking energy. Eb is also comparable to that observed with N660. Powdered AC exhibited some dust generation and weight loss during mixing. Therefore, pelletized AC would ultimately be preferable provided the hardness of the pellets is chosen so that they break up during rubber mixing operations. Pelletizing may be carried out using various processes used in the carbon black industry. By way of non-limiting example, the following U.S. Pat. Nos. describe applicable methods of pelletizing: U.S. Pat. No. 3,645,765, U.S. Pat. No. 3,776,750, U.S. Pat. No. 3,787,161, U.S. Pat. No. 3,825,233, U.S. Pat. No. 3,891,366, U.S. Pat. No. 3,927,988, U.S. Pat. No. 3,956,445, U.S. Pat. No. 3,969,457, U.S. Pat. No. 3,989,473, U.S. Pat. No. 4,005,170, U.S. Pat. No. 4,010,001, U.S. Pat. No. 4,047,896, U.S. Pat. No. 4,061,316, U.S. Pat. No. 4,099,899, U.S. Pat. No. 4,102,967, U.S. Pat. No. 4,136,975, U.S. Pat. No. 4,182,736, U.S. Pat. No. 4,337,294, U.S. Pat. No. 4,569,834, and U.S. Pat. No. 4,789,321, and Publ. Nos. 2003/0204967 and 2007/0203284.

TABLE 1

| Compound | A | B |
|---|---|---|
| SBR | 85 | 85 |
| NR | 15 | 15 |
| Various Carbon Fillers | Various | Amounts |
| Silica (Hisil 233) | — | 7.5 |
| Aromatic Oil | 14 | 14 |
| Zinc Oxide | 3.5 | 3.5 |
| Stearic Acid | 1 | 1 |
| Octamine | 1 | 1 |
| PE Wax | 1.5 | 1.5 |
| RF & PF Resins | 8.17 | 8.17 |
| Melamine Resin | 1.25 | 1.25 |
| Sulfur | 3.75 | 3.75 |
| Sulfenamide accelerator | 2.3 | 2.3 |
| TOTAL parts (less carbon fillers): | 136.47 | 143.97 |

TABLE 2

| Activated Carbon ("AC") | Source | Supplier Designation | Characteristics as received | Additional processing |
|---|---|---|---|---|
| A | Coconut shells | Carbon Activated Corporation | 20 × 50 mesh, GAC | None |
| B | Coal | Carbon Activated Corporation | 325 mesh, PAC | None |
| B1 | see B | Carbon Activated Corporation | " | Ground |
| B2 | see B | Carbon Activated Corporation | " | Ground, acid reactivated |
| B3 | see B | Carbon Activated Corporation | " | Ground, heat reactivated |
| C | Coconut shells | Carbon Activated Corporation | 80 × 325 mesh, PAC | None |
| C1 | see C | Carbon Activated Corporation | 80 × 325 mesh, PAC | Ground |
| C2 | see C | Carbon Activated Corporation | 80 × 325 mesh, PAC | Ground, acid reactivated |
| C3 | see C | Carbon Activated Corporation | 80 × 325 mesh, PAC | Ground, heat reactivated |
| D | Wood | Calgon, BG-HHM | 325 mesh, acid activated, PAC | None |
| D1 | see D | Calgon, BG-HHM | 325 mesh, acid activated, PAC | Ground |
| D2 | see D | Calgon, BG-HHM | 325 mesh, acid activated, PAC | Ground, heat reactivated |
| E | Wood | Carbon Activated Corporation | 325 mesh, steam activated, PAC | None |
| E1 | see E | Carbon Activated Corporation | 325 mesh, steam activated, PAC | Ground |
| E2 | see E | Carbon Activated Corporation | 325 mesh, steam activated, PAC | Ground, heat reactivated |

Table 5 shows the results of additional processing to reduce particle size of the powdered AC samples B and C, and optionally to reactivate the ground particles chemically with phosphoric acid. In Table 5, Ex. 11 is a remix of Ex. 7, and Ex. 15 is a remix of Ex. 9. It can be seen that there is considerable variability between remixes of the same recipe, which is believed due to the handling difficulties with these powdered AC samples. It is expected that pelletizing the ground AC in a manner similar to that used with carbon black for rubber applications will resolve these difficulties. In Table 5, Ex. 12 and 16 utilize AC samples B1 and C1, respectively, which are ground versions of the respective commercial grades. Comparing Ex. 12 to Ex. 11 shows that grinding the commercial AC improves the reinforcing effect in terms of ultimate tensile properties, at least for coal-based AC. In Table 5, Ex. 13, 14, 17, and 18 utilize AC samples B2 and C2, which are ground and acid-reactivated versions of the respective commercial grades. Comparing these four examples shows that acid reactivation is not very favorable in this rubber composition, but that for acid-reactivated AC, two hours of grinding is better than one hour of grinding, suggesting smaller particle size is better for reinforcing. As will be shown below, the real problem with sample C is the pore volume distribution. It is believed that the level of reinforcement exhibited by C reflects the preponderance of micropores and relative scarcity of meso and/or macropores.

TABLE 3

|  | Comp. Ex. 1 | Comp. Ex. 2 | Comp. Ex. 3 | Comp. Ex. 4 |
|---|---|---|---|---|
| Rubber compound[1] | A | A | A | A |
| Carbon Type[2] | None | N660 | A | A |
| Carbon Amount (phr) | 0 | 85 | 102 | 189 |
| Mooney Viscosity (132° C.) | 13.11 | 37.38 | 67.93 | shut off |
| MDR (177° C.) minimum torque (in-lb) | 0.31 | 1.36 | 1.89 | 5.86 |
| Max-Min torque (in-lb) | 5.43 | 19.17 | 7.21 | 8.75 |
| Tc90 (minutes) | 5.0 | 3.9 | 20.0 | 24.4 |
| Tb (psi) | 275 | 2445 | 189 | 230 |
| Eb (%) | 353 | 262 | 221 | 74 |
| M10 (psi) | 34 | 150 | 73 | 220 |
| M25 (psi) | 51 | 222 | 93 | 229 |
| M50 (psi) | 70 | 334 | 112 | 158 |
| M100 (psi) | 97 | 706 | 147 | — |
| M200 (psi) | 146 | 1851 | 187 | — |
| Breaking Energy (psi) | 500 | 2978 | 322 | 148 |
| Durometer (Shore A) | 37.4 | 70.3 | 66.7 | 85.4 |
| Specific Gravity | 0.99 | 1.2 | 1.07 | 1.12 |

[1]See Table 1.
[2]See Table 2 for AC types.

TABLE 4

|  | Comp. Ex. 5 | Comp. Ex. 6 | Ex. 7 | Ex. 8 | Ex. 9 | Ex. 10 |
|---|---|---|---|---|---|---|
| Rubber compound[1] | B | B | B | B | B | B |
| Carbon Type[2] | None | N660 | B | B | C | C |
| Carbon Amount (phr) | 0 | 85 | 85 | 107 | 85 | 107 |
| Mooney Viscosity (132° C.) | 12.3 | 35.2 | 49.8 | 75.9 | 57.9 | 77.3 |
| MDR (177° C.) minimum torque (in-lb) | 0.32 | 1.21 | 1.68 | 2.81 | 1.84 | 2.6 |
| Max-Min torque (in-lb) | 6.16 | 18.54 | 12.57 | 15.04 | 12.17 | 12.92 |
| Tc90 (minutes) | 5.57 | 4.19 | 14.87 | 19.19 | 15.23 | 22.98 |
| Tb (psi) | 547 | 2656 | 797 | 853 | 581 | 566 |
| Eb (%) | 465 | 282 | 411 | 307 | 327 | 255 |
| M5 (psi) | 27 | 108 | 68 | 93 | 72 | 84 |
| M10 (psi) | 37 | 144 | 94 | 129 | 99 | 116 |
| M25 (psi) | 57 | 217 | 142 | 197 | 150 | 167 |
| M50 (psi) | 78 | 345 | 206 | 292 | 215 | 230 |
| M100 (psi) | 107 | 762 | 348 | 490 | 354 | 355 |
| M200 (psi) | 161 | 1920 | 628 | 781 | 544 | 543 |
| Breaking Energy (psi) | 1023 | 3568 | 2424 | 1914 | 1472 | 1092 |
| C-Tear (lb/in) | 82 | 193 | 148 | 147 | 152 | 150 |
| Durometer (Shore A) | 40.3 | 65.1 | 73.2 | 72.5 | 66.4 | 69.9 |
| Specific Gravity | 1.02 | 1.22 | 1.2 | 1.23 | 1.12 | 1.14 |

[1]footnote

The examples with acid-reactivated AC (Ex. 13, 14, 17, and 18) exhibited slower cure rates than comparative examples with carbon black. Ex. 19 and 20 in Table 6 show the result of heat-reactivation of the ground AC, i.e., samples B3 and C3, respectively. The tensile strength of Ex. 19 and 20 is significantly improved over Ex. 13 and 17, respectively, even at a lower loading. The cure rate is also improved.

Table 6 shows the result of several of the above mentioned effects combined. AC sample D2, used in Ex. 21, is a commercial wood-based PAC from Calgon that has been further ground in a ball mill and then thermally reactivated by heating for about an hour up to about 1600° F. as described above. The reinforcing effect obtained with Ex. 21 is the best so far in terms of tensile strength and modulus, durometer, and MDR rheometer torque (Max.−Min.). Table 6 also indicates that the extra grinding and activation treatment improves the reinforcement over the as-received sample D used in Ex. 22. The improvement is repeated at a higher loading in Ex. 23 and 24, which also show that the additional activation step is helpful but not required if the starting material has the proper pore distribution. Pore distribution will be discussed in more detail below. Ex. 25 and 26 use a different AC source than Ex. 21-24. Ex. 25-26 are commercially steam activated wood-based AC, versus the chemically activated wood-based AC of Ex. 21-24. Both materials provide good reinforcement of the composition. Differences in pore distribution are discussed below.

TABLE 5

|  | Ex. 11 | Ex. 12 | Ex. 13 | Ex. 14 | Ex. 15 | Ex. 16 | Ex. 17 | Ex. 18 |
|---|---|---|---|---|---|---|---|---|
| Rubber compound | B | B | B | B | B | B | B | B |
| Carbon Type | C | C1[1] | C2[2] | C2[1] | B | B1[1] | B2[2] | B2[1] |
| Carbon Amount (phr) | 85 | 85 | 85 | 85 | 85 | 85 | 85 | 85 |
| MDR (200° C.) minimum torque (in-lb) | 1.47 | 1.38 | 0.86 | — | 1.81 | 1.30 | 1.02 | 1.08 |
| Max-Min torque (in-lb) | 15.44 | 13.95 | 9.29 | — | 10.86 | 10.78 | 7.76 | 9.86 |
| Tc90 (minutes) | 19.33 | 16.7 | 13.07 | — | 23.82 | 21.34 | 8.89 | 8.48 |
| Tb (psi) | 635 | 819 | 407 | 491 | 847 | 604 | 461 | 504 |
| Eb (%) | 198 | 243 | 279 | 326 | 259 | 221 | 284 | 288 |
| M10 (psi) | 139 | 128 | 99 | 93 | 118 | 114 | 85 | 93 |
| M25 (psi) | 213 | 194 | 146 | 134 | 189 | 171 | 129 | 139 |
| M50 (psi) | 305 | 285 | 201 | 187 | 290 | 240 | 181 | 194 |
| M100 (psi) | 485 | 494 | 298 | 290 | 501 | 391 | 283 | 305 |
| M200 (psi) | 634 | 785 | 394 | 441 | 805 | 593 | 426 | 457 |
| Breaking Energy (psi) | 899 | 1320 | 937 | 1196 | 1514 | 974 | 971 | 1054 |
| Durometer (Shore A) | 72 | 70 | 66 | 65 | 70 | 68 | 62 | 65 |

[1]Ground in vibratory mill for 2 hours.
[2]Ground in vibratory mill for 1 hour.

Table 7 shows that AC as a reinforcing filler exhibits reinforcing effects similar to highly reinforcing grades of carbon black. In Table 7, the compounds are mixed in a Banbury-type internal mixer, and the net loading after stack losses for the AC is calculated based on weight and indicated in parentheses. A comparison of Ex. 30, 31, and 32 to Comp. Ex. 27 shows that adding increasing amounts of AC results in increasing amounts of reinforcement, particularly in tensile properties, tear strength, and rubber hardness. A comparison of Ex. 30 to Comp. Ex. 28, and/or comparing Ex. 31 to Comp. Ex. 29, allowing for the effects of the weight loss of AC during mixing, shows that the AC sample D2 is reinforcing the rubber compound to an extent comparable with the N220 carbon black, which is one of the most reinforcing grades of carbon black commercially available.

TABLE 6

|  | Ex. 19 | Ex. 20 | Ex. 21 | Ex. 22 | Ex. 23 | Ex. 24 | Ex. 25 | Ex. 26 |
|---|---|---|---|---|---|---|---|---|
| Rubber compound[1] | B | B | B | B | B | B | B | B |
| Carbon Type[2] | B3 | C3 | D2 | D | D1 | D2 | E | E1 |
| Carbon Amount (phr) | 38 | 38 | 38 | 33.3 | 50 | 50 | 50 | 50 |
| MDR (175° C.) minimum torque (in-lb) | 2.62 | 0.81 | 2.07 | 3.90 | 3.88 | 4.29 | 1.08 | 1.06 |
| Max-Min torque (in-lb) | 2.06 | 3.73 | 2 | 11.0 | 9.69 | 10.33 | 12.9 | 11 |
| Tc90 (minutes) | 12.39 | 11 | 11.71 | 19.3 | 18 | 13.8 | 8.7 | 5.1 |
| Tb (psi) | 1096 | 688 | 1258 | 1000 | 892 | 1179 | 1129 | 871 |
| Eb (%) | 281 | 553 | 275 | 237 | 184 | 241 | 276 | 314 |
| M5 (psi) | 71 | 31 | 62 | 115 | 97 | 102 | 77 | 77 |
| M10 (psi) | 99 | 45 | 87 | 154 | 134 | 140 | 106 | 103 |
| M25 (psi) | 151 | 69 | 133 | 225 | 203 | 212 | 170 | 157 |
| M50 (psi) | 219 | 89 | 194 | 325 | 304 | 315 | 269 | 238 |
| M100 (psi) | 411 | 125 | 381 | 579 | 546 | 562 | 515 | 423 |
| M200 (psi) | 880 | 239 | 947 | 970 | — | — | 964 | 715 |
| Breaking Energy (psi) | 1697 | 2009 | 1712 | 1469 | 904 | 1568 | 1844 | 1720 |
| Durometer (Shore A) | 56 | 41 | 53 | 66 | 65 | — | 66 | 63 |
| Specific Gravity | 1.12 | 1.09 | 1.11 | 1.12 | 1.178 | 1.166 | 1.298 | 1.298 |

[1]Comp. Ex. 6 is considered a control compound with carbon black.
[2]AC was added gradually on a two-roll mill to avoid loss of AC.

TABLE 7

|  | Comp. Ex. 27 | Comp. Ex. 28 | Comp. Ex. 29 | Ex. 30 | Ex. 31 | Ex. 32 |
|---|---|---|---|---|---|---|
| Rubber compound | B | B | B | B | B | B |
| Carbon Type | None | N220 | N220 | D2 | D2 | D2 |
| Carbon Amount (phr)[1] | 0 | 25 | 50 | 25 (19) | 50 (38.5) | 85 |
| Mooney Viscosity (132° C.) | 13.5 | 21.5 | 33.6 | 34.3 | 87.9 | — |
| MDR (177° C.) minimum torque (in-lb) | 0.36 | 0.76 | 1.58 | 1.15 | 3.96 | 17.5 |
| Max-Min torque (in-lb) | 6.64 | 11.96 | 17.95 | 9.03 | 12.28 | 21.32 |
| Tc90 (minutes) | 5.5 | 4.22 | 4.28 | 8.85 | 17.02 | 21.93 |
| Tb (psi) | 550 | 1738 | 2498 | 1246 | 1590 | 1372 |
| Eb (%) | 420 | 411 | 344 | 321 | 229 | 92 |
| M5 (psi) | 24.9 | 53.6 | 110.1 | 43.7 | 100.9 | 354.9 |
| M10 (psi) | 34.7 | 71.6 | 138.2 | 61.4 | 141.5 | 494.0 |
| M25 (psi) | 54.3 | 106.2 | 190.8 | 96.5 | 224.4 | 684.3 |
| M50 (psi) | 76.6 | 146.8 | 263.1 | 141.0 | 370.9 | 867.9 |
| M100 (psi) | 106.6 | 237.7 | 465.5 | 257.0 | 774.7 | — |
| M200 (psi) | 170.2 | 572.7 | 1179.3 | 682.7 | 1454.9 | — |
| Breaking Energy (psi) | 893.8 | 2871.7 | 3741.9 | 1810.8 | 1949.0 | 796.7 |
| C-Tear (lb/in) | 71.9 | 160.1 | 232.3 | 141.9 | 127.9 | — |
| Durometer (Shore A) | 35 | 51 | 68 | 50 | 68 | 86 |
| Specific Gravity | 1.03 | 1.1 | 1.16 | 1.08 | 1.14 | 1.067 |

[1]Compounds are mixed in Banbury with net loading after stack losses in parentheses.

Table 8 shows a similar study as Table 7, but for the E and E1 samples of AC. Table 8 covers a broader range of loading, up to 200 phr. It can be seen that some ultimate properties fall off at the highest loading of AC, as occurs with conventional carbon black. Also at the highest loading, cure rate slows down. Also, it can be seen that abrasion resistance with for these AC examples is no better than the control Comp. Ex. 33.

TABLE 8

|  | Comp. Ex. 33 | Ex. 34 | Ex. 35 | Ex. 36 | Ex. 37 | Ex. 38 | Ex. 39 |
|---|---|---|---|---|---|---|---|
| Rubber compound | B | B | B | B | B | B | B |
| Carbon Type | None | E | E | E | E1 | E1 | E1 |
| Carbon Amount (phr) | 0 | 50 | 100 | 200 | 50 | 100 | 200 |
| Mooney Viscosity (132° C.) | 13.5 | 22 | 35 | 84 | 22 | 36 | 160 |
| MDR (177° C.) minimum torque (in-lb) | 0.32 | 0.65 | 1.08 | 2.83 | 0.62 | 1.06 | 5.55 |
| Max-Min torque (in-lb) | 5.50 | 9.6 | 12.9 | 17.2 | 9.45 | 11.53 | 17.38 |
| Tc90 (minutes) | 4.5 | 6.1 | 8.7 | 67 | 9.5 | 11.5 | 84 |
| Tb (psi) | 352 | 861 | 1129 | 1276 | 893 | 871 | 704 |
| Eb (%) | 379 | 394 | 276 | 136 | 314 | 314 | 177 |
| M5 (psi) | 31 | 40 | 77 | 224 | 44 | 77 | 255 |
| M10 (psi) | 39 | 58 | 106 | 315 | 61 | 103 | 339 |
| M25 (psi) | 56 | 93 | 170 | 484 | 97 | 157 | 412 |
| M50 (psi) | 75 | 137 | 269 | 645 | 140 | 238 | 452 |
| M100 (psi) | 100 | 235 | 515 | 1061 | 241 | 423 | 604 |
| M200 (psi) | 156 | 498 | 964 | — | 561 | 715 | |
| Breaking Energy (psi) | 609 | 1911 | 1844 | 1088 | 1360 | 1720 | 1009 |
| Pico Abrasion Index | 31.0 | 25.6 | 26.4 | 45.9 | 27.3 | 22.0 | 21.5 |
| Durometer (Shore A) | 35 | 53 | 66 | 80 | 51 | 63 | |
| Specific Gravity | 1.018 | 1.178 | 1.298 | 1.467 | 1.178 | 1.298 | 1.467 |

Figure 1:
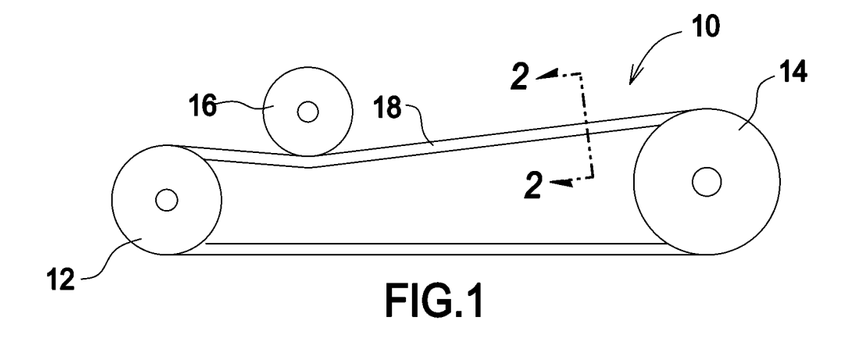
FIG. 1 is a simplified V-belt drive.
Figure 2:
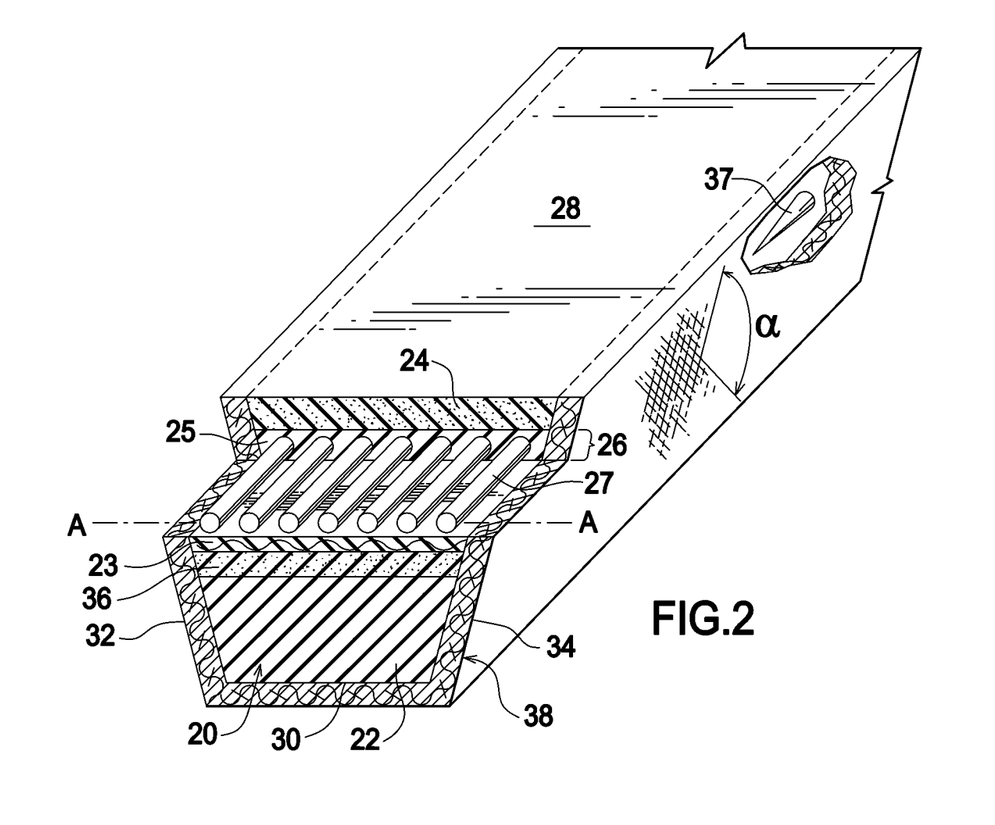
FIG. 2 is a perspective, partial sectional view of the banded V-belt of the drive of FIG. 1 taken along section 2-2.

Table 8 presents another series of examples carried out to show the usefulness of the AC-reinforced rubber compositions in a dynamic product where the AC is the primary rubber reinforcing filler. The compounds indicated as Ex. 41 and 42 were mixed and compared to a conventional composition Comp. Ex. 40. The two different formulations illustrate use of two different AC grades, requiring compounding at two different levels, to achieve comparable results to carbon-black-reinforced rubber formulations. The rubber compounds were used for the belt body of a banded v-belt. Covered or banded power transmission V-belts are normally constructed with an outer layer of rubber or other polymer impregnated fabric surrounding the belt core. The cover provides a number of functions, including protecting the belt from environmental elements, controlling the frictional characteristics of the belt, and resisting wear of the belt as it contacts the sheaves (pulleys) in a V-belt drive. Such an application is ideal for rubber compositions with AC as the primary reinforcing filler. Embodiments of the AC-filled rubber generally have suitable tensile properties, but may have low wear resistance properties which is not an issue in fabric covered belts. A typical banded V-belt drive system is shown in FIG. 1 of the drawings in which belt drive 10 includes banded v-belt 18 trained about sheaves 12 and 14 with tensioner pulley 16. A typical construction of banded v-belt 18 is shown in FIG. 2 in which a generally trapezoidal shaped belt body 20 may be formed of AC-reinforced rubber according to an embodiment of the invention. Belt 18 includes a compression section 22, a tension section 24, and a load-carrying section 26. Although such a V-belt may be used for various applications including for automotive and industrial transmission of power between complimentary shaped sheaves or pulleys, the banded V-belt of the invention is particularly adapted for industrial application. Standard single strand industrial V-belt cross sections applicable for the belt of the invention include industry standard sizes A, B, C, and D, 2L, 3L and 4L and 3V, 5V, 8V and metric sizes SPZ, SPA, SPB and SPC. These belts can have standard trapezoidal shapes with generally parallel top 28 and bottom 30 surfaces, and respective side surfaces 32, 34 which are inclined and converge toward one another as shown in FIG. 2 and which are the pulley contact surfaces. Alternatively, side surfaces 32, 34 may be somewhat concave, and top and bottom surfaces 28, 30 may be crowned or assume other conventional shape.

Belt body 20 is formed of rubber, and by "rubber" is meant a cross-linkable natural or synthetic elastomer which is processable in solid form e.g. on a mixing mill. Such rubber is typically mixed in a green or unvulcanized form, with appropriate additives, extenders, short fiber reinforcements, accelerators, AC as the primary reinforcing filler according to an embodiment of the invention, vulcanizing agents, e.g. sulfur or peroxides, and the like in a suitable batch or continuous mixer, well known in the rubber processing industry. Typical synthetic rubbers useful in the invention include polychloroprene, copolymers of ethylene and propylene, terpolymers of ethylene, propylene and diene monomers, e.g. EPDM, styrene butadiene rubber, natural rubber, butyl rubber, HNBR, CSM, silicone rubber, fluoroelastomers, mixtures of the foregoing, and alloys or mixtures of the foregoing or other known solid processable rubbers. Liquid processable elastomeric materials such as those formed by liquid casting, applicable to many forms of polyurethane, are not within this definition and are not contemplated by the invention.

Any of the various layers of the compression section 22, tensile section 24, and gum stock layer 25 sandwiching, and in which is embedded the spirally wound tensile members 27 of load-carrying section 26, may be formed of any of the aforementioned inventive rubber materials, which are typically plied up on a building drum as layers or calendared sheets of stock with or without textile reinforcement therein. The core or belt body of the V-belt of FIG. 2 may include fiber loaded rubber stock such as a composite of cotton and polyester fiber or any other suitable fiber such as aramid, and may be positioned in one or both of the compression and tensile sections. In the case of the belt of FIG. 2, both the outer most tensile section layer 24 and layer 36 of the compression layer may be suitably loaded with fiber reinforcement.

The load-carrying section 26, positioned more or less at the neutral axis of the belt, is preferably formed of single unit cord tensile members 27 which have been spirally wound over underlying rubber layers of the belt as it is being plied up on a drum, sandwiched between adhesion gum layers 25 of suitable type. In a preferred embodiment the rubber utilized in the belt is used in all portions of the compression, tension and load-carrying gum sections. Alternatively, particularly for extra long belts, the load-carrying section may be formed of multi-unit cord, such as calendared sheets of tire cord (load-carrying warp cord held together in a fabric form by spaced pick weft cords), and wrapped around the drum multiple times to form a number of layers constituting the load-carrying section.

Whether the load-carrying section is formed of single unit tensile cord or multi-unit cord, the load-carrying section extends substantially parallel to at least one of the top or bottom surfaces of the belt and intercepts the side surface of the belt as an "edge cord" shown at 37.

Optionally a cord support layer 23 is positioned just beneath the load-carrying section 26. The cord support layer 23 may be comprised of one or more calendared sheets of tire cord, with the heavier warp cords extending transversely to the tensile cord 27 to provide lateral support.

The belt body 20, along with such edge cord 37 is preferably covered by a band ply fabric 38 which traverses and is bonded to the bottom surface 30 and each of the side surfaces 32, 34 of the belt body so as to cover the load-carrying section at the position 37 that it intercepts the side surfaces of the belt body. Band fabric 38, as shown, may cover the side walls 32, 34 of the belt, extending above the cord line shown at A-A, and preferably to the top corners of the belt in a so-called "three-quarter" wrap. However, it is permissible for the band fabric layer 38 to traverse and cover the top surface 28 in a full wrap, including in a way that fabric layer 38 overlaps with itself. Instead the band fabric may be an inverted U-shaped band that traverses top surface 28 of the belt and wraps around the sides of tension section 24. Alternately, either layer may have a second layer, either inside or outside the first band ply and oriented opposite or the same as the first layer.

Band ply 38 is formed of a "fabric", that is, a planar textile structure produced by interlacing yarns, fibers, or filaments. The fabric may be a woven fabric, such as a square woven fabric, twill, knit, braid, or a non-woven such as a felt or needle-punched fleece. For many industrial applications it is preferred to use a woven fabric in which the angle between the warp and weft yarns exceeds the normal 90 degrees included angle, and is preferably in the range of from about 95° to about 125° with the most preferred angle being from about 100 to about 120°, as applied to the belt at angle α. This included angle may be utilized for the band ply 38 covering the side surfaces of the belt of FIG. 2, and may also be used as additional optional layers of band ply fabric which may be utilized in other embodiments.

Band ply 38 will typically be rubberized on at least the inner side facing the belt body, for adhesion thereto. The exterior surface may be left bare, for clutching applications, or also rubberized as desired. In other embodiments, the pulley contact surface, covered with fabric, may be that of a toothed belt, multi-v-ribbed belt, round belt, flat belt or the like.

The belt results in Table 9 include Comp. Ex. 43, which represents the range of results exhibited by a number of comparable banded V-belts found on the open market. The belt of Comp. Ex. 40 is considered a premium belt with excellent high load test performance. The results show that AC-reinforced belts according to the invention are competitive with banded belts found in the market, but not quite as good as the premium belt of Comp. Ex. 40.

TABLE 9

|  | Comp. Ex. 40 | Ex. 41 | Ex. 42 | Comp. Ex. 43 |
|---|---|---|---|---|
| Rubber compound | B | B | B |  |
| Carbon Type | N660 | D2 | E |  |
| Carbon Amount (phr) | 85 | 47 | 160 |  |
| Mooney Viscosity (132° C.) | 48.7 | 89.6 | 73.9 |  |
| MDR (177° C.) minimum torque (in-lb) | 1.97 | 4.29 | 2.5 |  |
| Max-Min torque (in-lb) | 18.56 | 10.33 | 20.2 |  |
| Tc90 (minutes) | 2.8 | 13.8 | 21.2 |  |
| Tb (psi) | 2273 | 1179 | 985 |  |
| Eb (%) | 209 | 241 | 166 |  |
| M5 (psi) | 163 | 102 | 156 |  |
| M10 (psi) | 209 | 140 | 220 |  |
| M25 (psi) | 291 | 212 | 337 |  |
| M50 (psi) | 422 | 315 | 463 |  |
| M100 (psi) | 879 | 562 | 739 |  |
| Breaking Energy (psi) | 2282 | 1568 | 1046 |  |
| C-Tear (lb/in) | 225 | 139 | 121 |  |
| Pico Abrasion Index | 128.7 | 40.6 | 26.0 |  |
| Durometer (Shore A) | 68 | 62 | 84 |  |
| Specific Gravity | 1.24 | 1.14 | 1.28 |  |
| DeMattia Flex (in./Megacycle at 100° C.) | 93.1 | 33.7 | 75.3 |  |
| V-Belt Test Lives (hrs) |  |  |  |  |
| High Load Test | 116 | 23 | 47 | 5-21 |
| Backside Idler Flex Test | 45 | 31 | 62 | 28-132 |

Figure 3:
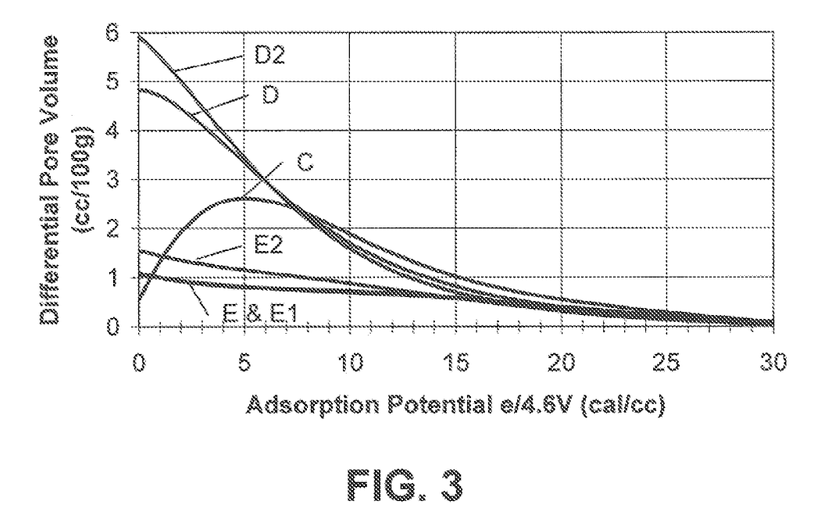
FIG. 3 is a graph of a pore-volume-based differential characteristic curve for several grades of activated carbon according to an embodiment of the invention.

Several of the AC samples of Table 2 were subjected to extensive characterization testing, including particle size distributions and pore volume characteristic curves. The results are summarized in Table 10. The particle size distribution measurement was performed on a Microtrac laser particle size analyzer. The pore volume characteristic curve was obtained by a reportedly "reliable, rapid and convenient gravimetric method invented by Dr. Mick Greenbank, that has been named the Gravimetric Adsorption Energy Distribution (GAED) Method" by Professional Analytical and Consulting Services Inc. (d.b.a. PACS). This method provides complete characteristics of the absorbent potential of a sample of AC. The applicability of this method to rubber fillers for predicting reinforcement efficacy has yet to be fully explored. Nevertheless, the inventors have found GAED to provide a clear indication of which AC types seem to offer the best performance as primary reinforcing filler in rubber compositions. The primary result of the GAED method is a cumulative characteristic curve and a differential characteristic curve which may be graphed as pore volume in cc/100 g carbon versus adsorption potential e/6.4V (cal/cc). FIG. 3 shows such characteristic curves for six activated carbon samples. The particular tests reported in FIG. 3 and Table 10 utilized 1,1,1,2-tetrafluoroethane (C134a) as the adsorbent gas molecule. PACS reports that the characteristic curve can be converted to BET surface areas or pore size distributions, as alternative ways to think of the results. This results in the approximate conversion from adsorption potential to pore diameter provided in Table 11.

Referring to FIG. 3, it can be seen that the coconut shell AC sample C exhibits a peak in the characteristic curve at about 5 cal/cc. This peak represents typical and desirable behavior of AC used for absorption applications. As mentioned above, such AC as sample C is only borderline useful as a primary reinforcement in rubber compositions. Samples D and E are much preferred grades of AC for use as rubber reinforcing fillers, even though they would be considered relatively poor for absorption applications. Thus, the last row of Table 10 indicates with "+" signs the relative reinforcing effect of the six samples listed. More plus signs means more reinforcing. The characteristic curves of each of these grades peaks at zero potential. In other words, these characteristic differential curves decrease monotonically or have negative slope. In terms of pore diameter, these grades have relatively high proportions of meso and macropores, with diameters greater than about 1 nm, preferably greater than 2 or 3 nm or even in the range of 3 to 10 nm.

A comparison of the characteristic curves for D2 versus D and for E2 versus E and E1 shows that the process of further activating the AC by heat increases the proportion of large pores and therefore increases the filler reinforcing effect in rubber. The total pore volume, listed in Table 10, is also an important number. Comparing sample D to E, it appears that the total pore volume correlates inversely with the amount of AC needed to achieve a desired modulus in a rubber composition. It is also notable that the grinding of the E sample of AC did not achieve a significant reduction in particle size, probably due to reagglomeration of the particles. Based on the more accurate laser measurements, the particle size, based on a weight or volume average, is preferably less than 140, preferably less than 100 or less than 100 microns or less than about 30 microns. In terms of number-average particle diameter, the AC particle size is preferably less than 10, or less than 5 microns. Smaller is better for enhanced large strain reinforcing of rubber.

TABLE 10

| Reinforcing AC Type | C | D2 | D | E | E1 | E2 |
|---|---|---|---|---|---|---|
| Source | coconut | wood | wood | wood | wood | wood |
| % moisture | 8.91% | 8.66% | 32% | 2.01% | 3.01% | 1.62% |
| $N_2SA$ (m$^2$/g) | 668 | 732 | 738 | 297 | 310 | 346 |
| Apparent Density (g/cc) | 0.2 | 0.5 | 0.5 | 0.383 | 0.384 | 0.387 |
| Total Pore Volume (cc/100 g) | 35.62 | 45.52 | 44.56 | 16.76 | 17.44 | 19.93 |
| Particle Size-Vol. Avg. (μm) | 136.3 | 28 | 31.2 | 8.1 | 19.6 | 14.7 |
| Particle Size-Num. Avg. (μm) | 6.32 | 2.4 | 4.2 | 1.97 | 2 | 2.6 |
| Peak Adsorption Potential e/4.6 V (cal/cc) | 5 | 0 | 0 | 0 | 0 | 0 |
| Reinforcing effect | + | +++ | +++ | ++ | ++ | ++ |

TABLE 11

| Adsorption Potential e/6.4 V (cal/cc) | Pore Diameter (nm) |
|---|---|
| 0 | 10 |
| 1 | 3 |
| 2 | 2 |
| 3 | 1.5 |
| 5 | 1 |
| 10 | 0.8 |
| 20 | 0.55 |

Rubber compositions according to the present invention may thus be useful in belts, including power transmission belts such as v-belts, multi-v-ribbed belts, flat belts and toothed belts, and in tires, hose, and other rubber products in general. Preferred belt forms include those have a fabric cover on the pulley-contact surface, such as toothed belts with stretch fabric covering the teeth, banded v-belts and certain molded v-ribbed belts with knit, non-woven or other fabric covering the ribs.

Although the present invention and its advantages have been described in detail, it should be understood that various changes, substitutions, and alterations can be made herein without departing from the scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A rubber composition comprising as the primary reinforcing filler activated carbon comprising: a pore volume of 0.15 cc/g or more; a volume-average particle diameter of less than 130 microns; and a differential characteristic curve of pore volume versus adsorption potential by the GAED or equivalent method having a peak value at less than 5 cal/cc; wherein the amount of said primary reinforcing filler is greater than the amount of any other reinforcing filler present in the composition; and said composition comprises 100 parts by weight of one or more elastomer and from 25 to 250 parts by weight activated carbon as the primary reinforcing filler.

2. The composition of claim 1 wherein said activated carbon is cellulose based or coal based.

3. The composition of claim 1 wherein said activated carbon is wood based.

4. The composition of claim 1 wherein the amount of said primary reinforcing filler is greater than the total amount of all other reinforcing fillers present in the composition.

5. The composition of claim 1 wherein said activated carbon has a total pore volume of 0.35 cc/g or more and a weight-average particle size of less than about 30 microns.

6. The composition of claim 5 wherein said activated carbon has less than 50% ash content and greater than 50% carbon content.

7. The composition of claim 1 wherein said activated carbon further comprises a number-average particle diameter of less than 10 microns.

8. The composition of claim 1 wherein said peak value is at zero cal/cc.

9. A method comprising:
 a) selecting a particulate activated carbon material comprising: a pore volume of 0.15 cc/g or more; a weight-average particle diameter of less than 130 microns; and a differential characteristic curve of pore volume versus adsorption potential by the GAED or equivalent method having a peak value at less than 5 cal/cc;
 b) mixing said activated carbon into a rubber composition as the primary reinforcing filler wherein the amount of said primary reinforcing filler is greater than the amount of any other reinforcing filler present in the composition; and said composition comprises 100 parts by weight of one or more elastomer and from 25 to 250 parts by weight activated carbon as the primary reinforcing filler.

10. The method of claim 9 further comprising: grinding said activated carbon to a number-average particle diameter of less than 5 microns.

11. The method of claim 10 further comprising at least one additional activation treatment on said ground activated carbon.

12. The method of claim 9 wherein said mixing comprises blending said activated carbon and a rubber polymer before adding any curatives.

13. A method comprising:
 a) selecting a charcoal material;
 b) activating said charcoal material to form an activated carbon with a pore volume of 0.15 cc/g or more and which exhibits a differential characteristic curve of pore volume versus adsorption potential by the GAED or equivalent method having a peak value at less than 5 cal/cc;
 c) grinding said charcoal material or said activated carbon to a particle size less than 325 mesh and a volume-average particle diameter of less than 130 microns; and
 d) mixing said activated carbon into a rubber composition as the primary reinforcing filler wherein the amount of said primary reinforcing filler is greater than the amount of any other reinforcing filler present in the composition; and said composition comprises 100 parts by weight of one or more elastomer and from 25 to 250 parts by weight activated carbon as the primary reinforcing filler.

14. A power transmission belt comprising a body and a pulley contact surface; said body comprising a rubber composition having activated carbon as the primary reinforcing filler therein, wherein said activated carbon comprises: a pore volume of 0.15 cc/g or more a volume-average particle diameter of less than 130 microns; and a differential characteristic curve of pore volume versus adsorption potential by the GAED or equivalent method having a peak value at less than 5 cal/cc; and wherein the amount of said primary reinforcing filler is greater than the amount of any other reinforcing filler present in the composition; and said composition comprises 100 parts by weight of one or more elastomer and from 25 to 250 parts by weight activated carbon as the primary reinforcing filler.

15. The belt of claim 14 further comprising a fabric cover on said pulley contact surface.

16. The belt of claim 15 in the form of a banded v-belt.

17. The belt of claim 14 wherein said peak value is less than 2 cal/cc.

18. The belt of claim 17 wherein said peak value is zero cal/cc.

19. A rubber product comprising the rubber composition of claim 1.

20. The rubber product of claim 19 in the form of a power transmission belt.

21. The rubber product of claim 19 in the form of a hose.

22. The rubber product of claim 19 in the form of a tire.

* * * * *